United States Patent [19]

Wang

[11] Patent Number: 5,035,389
[45] Date of Patent: Jul. 30, 1991

[54] MOUNTING DEVICE

[76] Inventor: Shu-San Wang, No. 83, Lane 29, Hua-Cheng Rd., Hsinchuang City, Taiwan

[21] Appl. No.: 570,055

[22] Filed: Aug. 20, 1990

[51] Int. Cl.$^5$ ............................................. F16N 13/00
[52] U.S. Cl. ............................ 248/224.1; 248/224.2; 248/225.1; 248/221.4
[58] Field of Search ............... 248/224.1, 224.2, 225.1, 248/223.4, 222.1, 221.4, 221.3

[56] References Cited

U.S. PATENT DOCUMENTS

| 4,132,380 | 1/1979 | Pastore | 248/224.1 |
| 4,307,864 | 12/1981 | Benoit | 248/221.3 |
| 4,524,938 | 6/1985 | Strahs et al. | 248/224.1 |
| 4,974,798 | 12/1990 | Harding et al. | 248/221.4 X |

Primary Examiner—Alvin C. Chin-Shue
Attorney, Agent, or Firm—Sughrue, Mion, Zinn, Macpeak and Seas

[57] ABSTRACT

A mounting device includes a trapezoidal plate with a tapered top edge and a bottom edge. A pair of ribs project from the bottom edge. Each of the ribs has a first portion and a second portion, the latter each having an engaging member at its end. The second portions are resilient and separated from the plate. The mounting device also has an attached body attached to a receptacle. The attached body includes a pair of attaching members, each of which has a channel and a guiding path formed in-between the channels. The trapezoidal plate can be inserted into the guiding path of the attached body to engage the same by the engaging members of the ribs.

11 Claims, 7 Drawing Sheets

MOUNTING DEVICE

BACKGROUND OF THE INVENTION

The present invention relates to a mounting device, more particularly to mounting device endowed with strength and ornamentality.

There are many types of mounting devices presently on the market. One such device is a suction cup with a hook. The suction cup is stuck onto a wall, but does not stick long enough and can not carry heavy things, as a result of its limited strength, so it may fall off the wall at any time. Stronger mounting devices involve nailing a container or a cloth hanger to a wall, but if the container is large more nails are needed to do the job. Too often, though, nailing into a wall damages the appearance of the wall, so such kind of mounting device is not very welcome.

SUMMARY OF THE INVENTION

It is therefore a main object of the present invention to provide a mounting device which is both strong and attractive.

According to the present invention, a mounting device includes a receptacle; a trapezoidal plate having a tapered top edge and a bottom edge; a pair of ribs extending from the bottom edge to the tapered top edge; each of the ribs including a first portion and a second portion, said first portions being integrally formed with said trapezoidal plate, said second portions being resilient and seperated from said trapezoidal plate and each having an engaging member at the end thereof; and an attached body including two attaching members. The attaching members, each having an edge facing the other, are mounted on the receptacle. Each of the attaching members has a channel along the edge adjacent to the planar face of the receptacle to allow the trapezoidal plate to slide through and sandwich the same, while the engaging members of the second portion engage the attached members at their top of the edges.

BRIEF DESCRIPTION OF THE DRAWINGS

Other features and advantages of the present invention will become apparent in the following detailed description including drawings, all of which show a non-limiting form of the invention, and of which.

DETAILED DESCRIPTION OF THE PREFERRED EMBODIMENT

Figure 1:
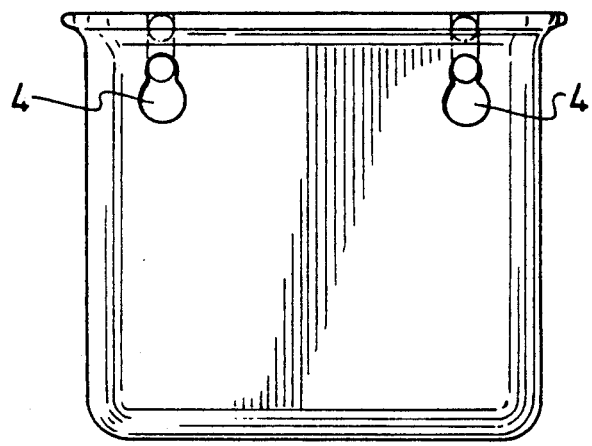
FIG. 1 depicts a mounting device of the prior art.

FIG. 1 shows a mounting device of the prior art. In it, the nails 4 holding a receptacle may shift after a long period of time or if the receptacle is overweighted, as indicated by the perforated lines.

Figure 2:
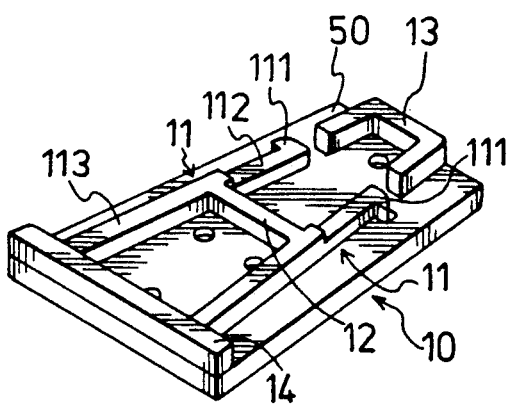
FIG. 2 shows a trapezoidal plate of the mounting device according to the present invention.
Figure 3:
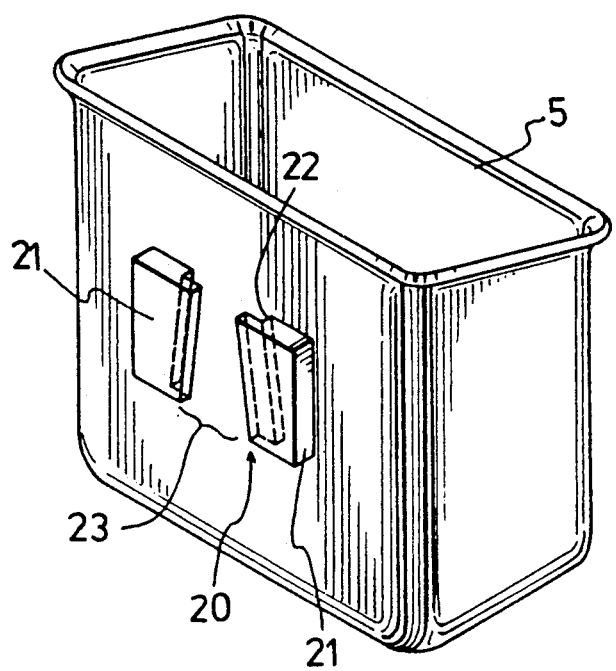
FIG. 3 shows the attached body of the mounting device of the present invention, attached to a receptacle.
Figure 4:
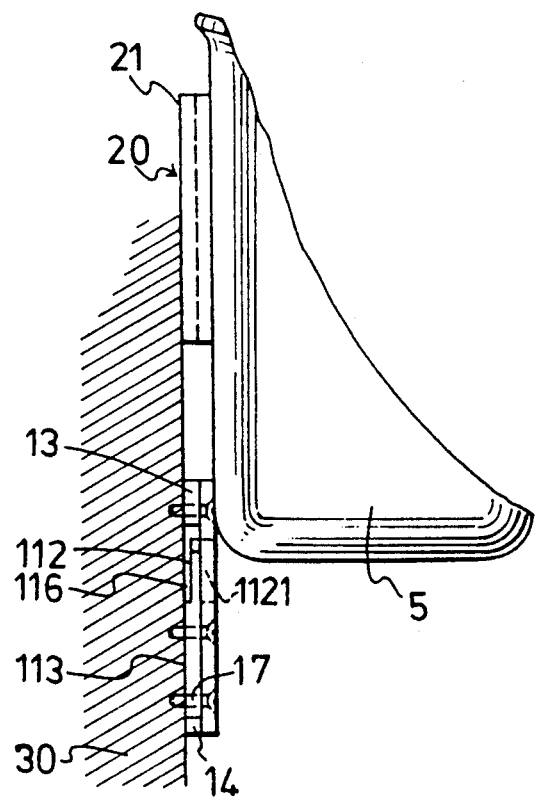
FIG. 4 shows a fragmented sectional view of the mounting device according to the present invention.
Figure 5:
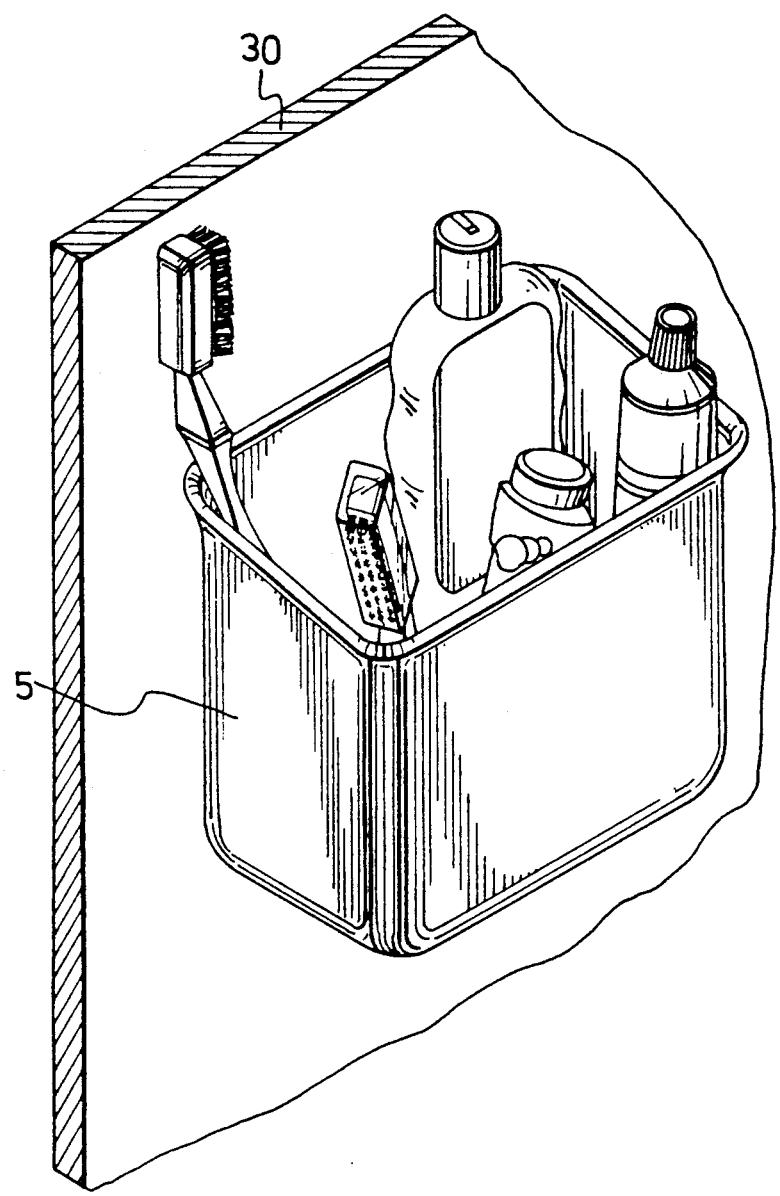
FIG. 5 is a perspective view of the mounting device of the present invention.

FIGS. 2 and 3 show a mounting device of the present invention. Accordingly, it includes a generally trapezoidal plate 10 having a tapered top edge and a bottom edge, a pair of of ribs 11, being substantially titled toward one another, extending from the bottom edge to the tapered top edge. The pair of ribs 11 are connected by an enforcing rod 14 at the bottom edge of the trapezoidal plate 10. The trapezoidal plate also has an enforcing frame 13 at the tapered top edge. Each of the ribs 11 has a first portion 113 and a second portion 112 with an engaging member 111 at the free end of the second portion. The first portions 113 are integrally formed with said trapezoidal plate 10 and the second portions 112 are resilient and seperated from said trapezoidal plate. An enforcing rod connects the two second portions. The first portions 113 is longer than the second portions 112. The mounting device also includes a attached body 20 attached to a receptacle, which attached body has a pair of attaching members 21, which generally face the other. Each of the attaching members 21 has a channel 22 along the edge and a guiding path 23 between the channels which is adapted to accomodate the trapezoidal plate 10, which slides through and engages the attaching member at the top edge. The trapezoidal plate 10 also has a plurality of holes through which a plurality of screws 17 can pass, to secure it to a wall 30. The thickness of the first portion 113 is greater than that of the second portion 112 so that a clearance 116 remains between the second portion 112 and the wall 30 when the trapezoidal plate is inserted into the attaching members 21 through the guiding path 23, and is held by the engaging member 111 of the second portion, as best shown in FIG. 4. FIG. 5 shows a receptacle 5 of the mounting device of the present invention, holding a plurality of articles.

Figure 7:
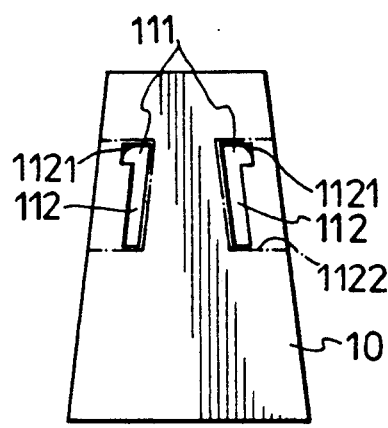
FIG. 7 is a detailed view of the emptied spaces being cut away from the trapezoidal plate according to the present invention.

To enable the engaging members 111 of the second portions 112 smoothly and resiliently to pass through the attaching members 21, and to reduce the abrading friction between them, an emptied space 1121 or a larger space 1122 is cut away from the trapezoidal plate 10 as illustrated in FIG. 7.

Figure 6A:
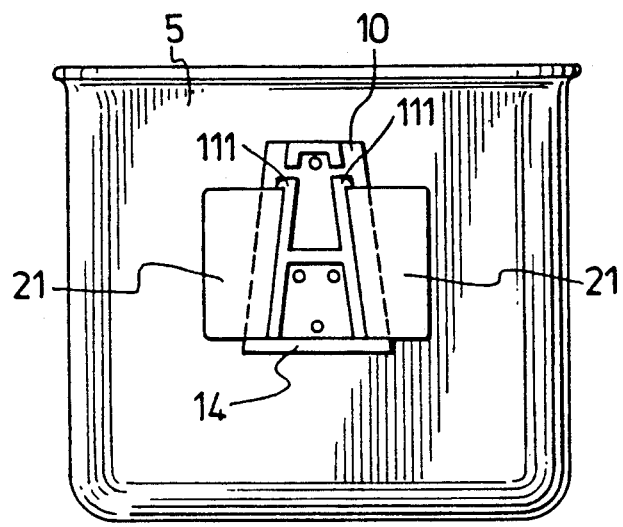
FIGS. 6(A) and 6(B) show the ways of inserting the trapezoidal plate into the attached body, and of engaging the same, according to the present invention.
Figure 6B:
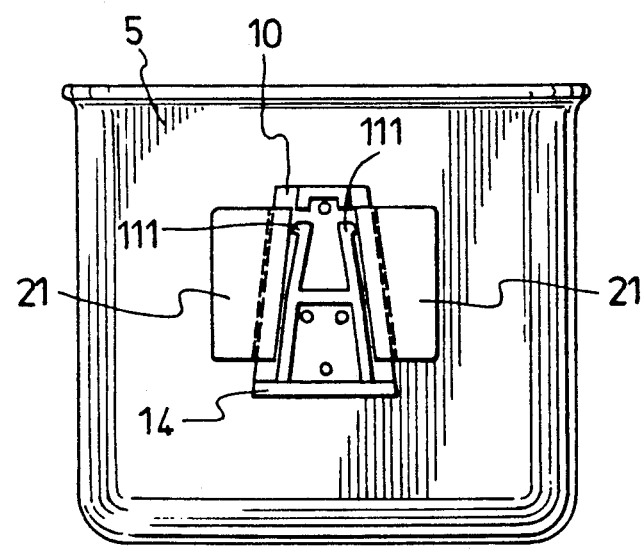

FIGS. 6(A) and 6(B) show the engaging members 111 of the second portions 112 engaging the attaching members 21 of the trapezoidal plate 10, and the trapezoidal plate 10 being inserted into the attaching members 21 while the engaging members 111 abut the same.

Figure 8:
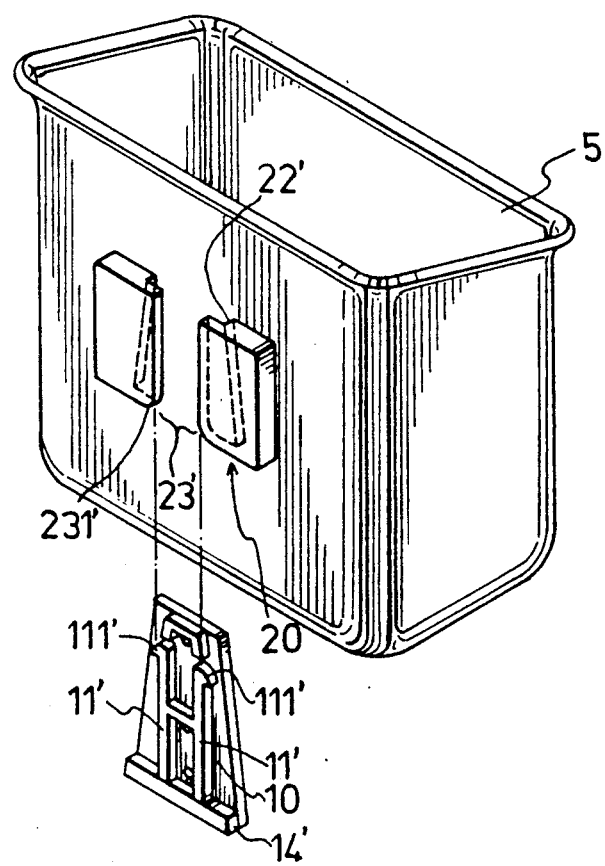
FIG. 8 shows a form of the mounting device of the present invention.

The pair of ribs 11' with engaging members 111' at one end thereof, which extends from the bottom edge 14' of the trapezoidal plate 10 can be constructed in various ways, including parallel ribs as shown in FIG. 8. The attached body 20 has channels 22' and a guiding path 23' with guiding tips 231'. The trapezoidal plate 10 is inserted into the guiding path 23' of the attached body through the guiding tips 231'.

Figure 9:
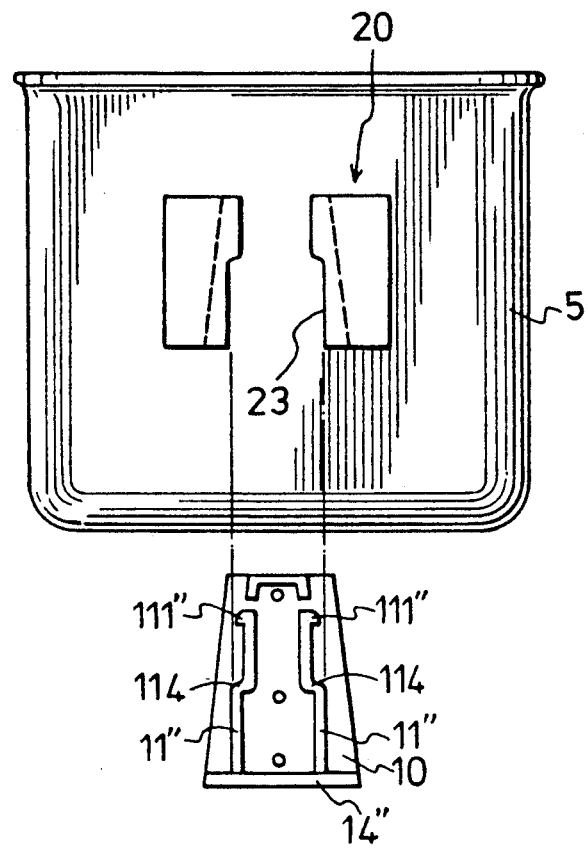
FIG. 9 shows another form of the mounting device of the present invention.

As shown in FIG. 9, a pair of ribs 11' extends from the bottom edge 14" and has a bend 114 between the first and the second portions, and is being inserted into the attached body 20 through the guiding path 23.

Figure 10:
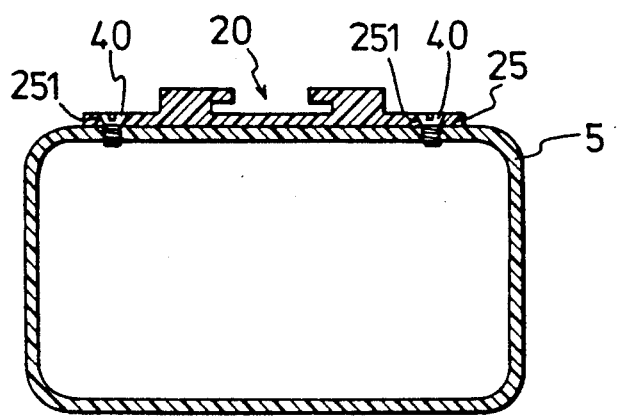
FIG. 10 shows the attached body being integrally formed with the trapezoidal plate of the mounting device of the present invention.

In another preferred embodiment, the attached body 20 is integrally formed with the trapezoidal plate 25, which has a plurality of holes through which a plurality of screws 40 can pass to fasten the receptacle 5 to the plate 25. The holes in the trapezoidal plate are made in such a way that the screws fasten through them can not be seen from outside, so as not damage the outward appearance of the mounting device of the present invention, as best shown in FIG. 10.

Figure 11:
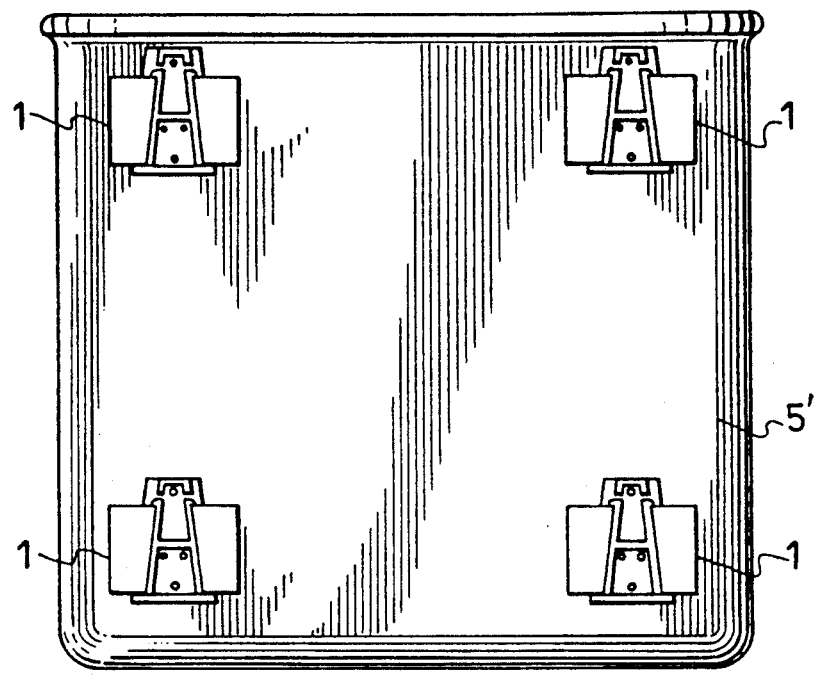
FIGS. 11 and 12 show mounting devices of the present invention in use.
Figure 12:
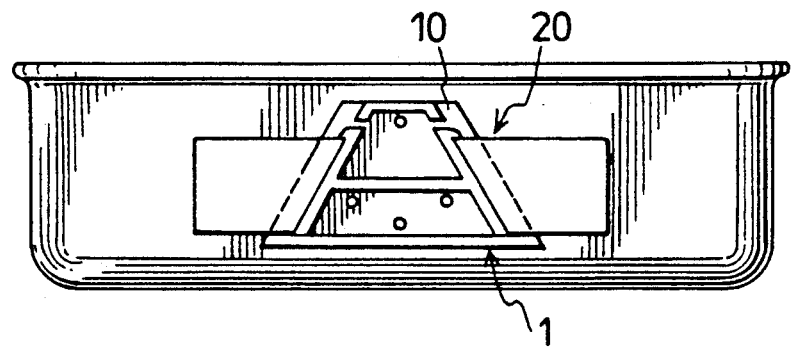

The mounting device 1' of the present invention can be in several sizes relative to the receptacle 5', as best shown in FIG. 11, wherein the receptacle 5' is so large that it needs four mounting devices 1 to accomplish the task. As in FIG. 12, a mounting device 1, substantially large, including a trapezoidal plate 10 and an attached body 20 is needed to hold a large receptacle. The engaging members of the mounting devices of the present invention are so firm that it is not as easily dismantled as in the prior art, so it is much preferable.

While the invention has been described in connection what is considered to be the most practical and preferred embodiment, it is not to be limited to the disclosure only, but on the contrary, it is intended to cover various modifications and equivalent arrangements within the broadest interpretation of the scope and spirit of the present invention so as to emcompass all such modifications and equivalent arrangements.

I claim:

1. A mounting device mounted on a receptacle, comprising:

a trapezoidal plate having a tapered top edge and a bottom edge, a pair of ribs extending from said bottom edge toward said tapered top edge, each of said ribs including a first portion and a second portion, said second portion being resilient and seperated from said trapezoidal plate and each of said second portions having an engaging member formed at one end thereof;

an attached body attached to said receptacle and having a pair of attaching members, each having an edge facing the other, each of said attaching members having a channel along said edge adjacent a planar face of said receptacle which is adapted to let said trapezoidal plate slide in and to sandwich said plate between said channels while said engaging members of said second portions engage a top of said edges of the attaching members.

2. A mounting device as claimed in claim 1, wherein said trapezoidal plate further comprises a plurality of holes through which a plurality of fixing means can pass to fasten said trapezoidal plate to a wall.

3. A mounting device as claimed in claim 1, wherein said fixing means are a plurality of screws.

4. A mounting device as claimed in claim 1, wherein said pair of ribs are slightly convergent, and wherein a shoulder is formed where said first portion is connected to said second portion.

5. A mounting device as claimed in claim 1, wherein said pair of ribs is connected by an enforcing rib, said enforcing rib fitting snugly between said channels of said attaching members.

6. A mounting device as claimed in claim 1, wherein the length of said first portion is greater than that of said second portion.

7. A mounting device as claimed in claim 1, wherein said second portions are connected by an enforcing rib.

8. A mounting device as claimed in claim 2, wherein the thickness of said first portion is greater than that of said second portion so that when said trapezoidal plate is inserted into said channels of said attaching members, a clearance remains between said second portions and said wall.

9. A mounting device as claimed in claim 1, wherein said trapezoidal plate has an emptied space underneath each of said second portions.

10. A mounting device as claimed claim 1, wherein said pair of ribs attaching members are integrally formed with said trapezoidal plate, and said attaching members being secured to said receptacle.

11. A mounting device as claimed in claim 1, wherein said trapezoidal plate further comprises an enforcing rib at said tapered top edge thereof.

* * * * *